Feb. 11, 1936.    R. M. McMILLIN ET AL    2,030,647
SPLASH OILING SYSTEM
Filed June 2, 1934
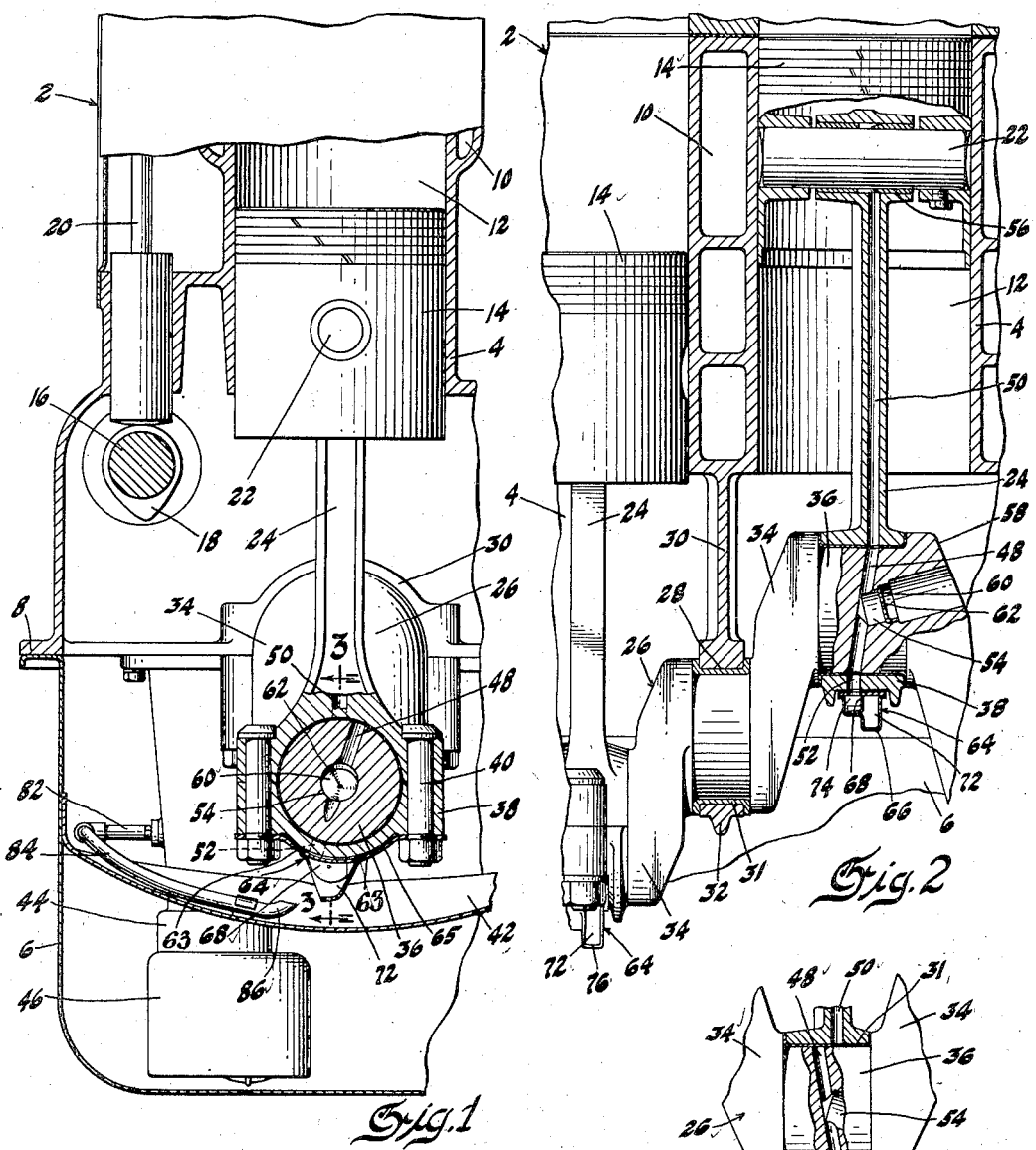
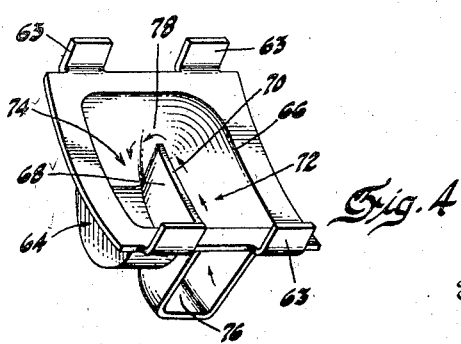
Inventors
Robert M. McMillin &
Alex Taub
By Blackmore, Spencer & Flint
Attorneys Patented Feb. 11, 1936

2,030,647

UNITED STATES PATENT OFFICE 2,030,647

SPLASH OILING SYSTEM

Robert M. McMillin and Alex Taub, Detroit, Mich., assignors to General Motors Corporation, Detroit, Mich., a corporation of Delaware Application June 2, 1934, Serial No. 728,688

10 Claims. (Cl. 184—11)

This invention relates to lubricating systems and has particular reference to a means for utilizing the centrifugal force of rotation of the crank shaft to lubricate the crank pin bearings and the wrist pins of the pistons.

Prior lubricating systems used on internal combustion engines of automotive vehicles have made use of either (1) a force feed system in which the usual oil pump forced the oil through a suitable system of passages to the crank pin bearing and to the wrist pin, or (2) the splash system was used in which a fin or projection on the bearing cap of the connecting rod is caused to strike the oil in the oil pan to cause it to splash and lubricate the working parts. Some disadvantages have prevented adequate lubrication when either system has been used. When the force feed system is used it has been found that the centrifugal force created by the rapid rotation of the crank shaft is so great that it takes a very high pump pressure to overcome it; with the splash system the lubrication of the moving parts has been somewhat uncertain.

In the present invention the crank pin is provided with an inclined passage which mates with a corresponding passage in the connecting rod at the upper portion only of the cycle of rotation of the crank pin. The lower portion or bearing cap of the connecting rod has secured thereto a dipper which dips up a portion of oil from the oil pan at the lowermost portion of the cycle of rotation of the crank pin. The bearing cap has an opening therein which will allow the oil taken up by the dipper to move into the inclined passage in the crank pin when the crank pin is at the upper portion of its cycle of rotation. It is only at this upper portion that the inclined passage communicates with the opening in the bearing cap. It is obvious that when the crank pin is at the upper portion of its cycle of rotation the centrifugal force will tend to move any oil to the outermost portion of the crank shaft. Accordingly, the oil in the dipper is moved into the interior of the crank pin and the oil already in the crank pin is caused to move into the connecting rod passage to move toward the wrist pin. A suitable chamber or reservoir is provided in the crank pin to store oil.

On the drawing

Figure 1 is a transverse sectional view through one cylinder of a multi-cylinder internal combustion engine showing one of the crank pins at the lowermost portion of its cycle of rotation.

Figure 2 is a longitudinal sectional view through two of the cylinders of the engine showing at the right one of the crank pins at the uppermost portion of the cycle of rotation, and at the left a crank pin at a position between the upper and lowermost portion of the cycle of rotation.

Figure 3 is a detailed transverse sectional view showing the position of the parts when the crank pin is at the lowermost portion of its cycle of rotation, the figure being taken substantially on the line 3—3 of Figure 1.

Figure 4 is a perspective view of the dipper per se.

Referring to the drawing, the numeral 2 indicates an internal combustion engine as a whole. The engine has the cylinder block 4 with the oil receptacle or pan 6 secured thereto in a conventional way at 8. The water circulating system is indicated at 10, the cylinders at 12, the pistons at 14, the cam shaft at 16, the cams at 18, the push rods for the valves at 20, the wrist pins at 22, the connecting rods at 24, and the crank shaft at 26. The crank shaft 26 is mounted in bearings 28 positioned in the ribs 30 in the crank case 4. The bearing shells 31 are held in position by the usual bearing caps 32. The crank shaft 26 has the usual throws 34 spaced 120° apart and each throw has a crank pin 36. The connecting rods 24 are secured to the crank pins 36 by means of the bearing caps 38 which are secured to the connecting rod by means of the bolts and nuts 40. Inside the oil pan there are mounted lubricant troughs or receptacles 42. The usual oil pump is indicated at 44 while 46 indicates the screen over the inlet to the pump.

The parts so far described are conventional, and per se form no part of the invention.

Each crank pin 36 is provided with an inclined oil passage 48 and each connecting rod has an oil passage 50 while the bearing caps 38 have a lubricant opening 52. As shown in Figure 2 when the crank pin 36 is at the uppermost portion of its cycle of rotation, the inclined passage 48 has its ends in communication with both the opening 52 and the passage 50 so that the centrifugal force will cause any lubricant in the passage 48, or the chamber or reservoir 54 in the crank pin, to move outwardly through the passage 50 toward the wrist pin 22. Accordingly, each time the crank pin reaches the position shown at the right in Figure 2, there will be a shot of oil passed from the chamber 54 and passage 48 into the passage 50 to cause the oil to travel upward to the bearing 56 of the wrist pin.

The chamber 54 may be formed in any suitable way. As shown in the drawing it is drilled from one face 58 of the crank throw until it meets the passage 48. A plug 60 having a small vent opening 62 is then used to close the drilled opening and to form the chamber 54. The purpose of the vent 62 is to prevent air from being trapped in the receptacle 54 and passage 48 and interfering with the proper distribution of lubricant.

Secured to the connecting rod bearing cap 38 by means of bolts 40 is a dipper 64. This dipper is described and claimed in the copending application of Robert M. McMillin Ser. No. 728,687, filed June 2, 1934, and is secured by the fingers 63 to a member 65 secured to the cap 38 by the bolts and nuts 40. The dipper comprises a main portion 66 and a secondary portion 68. The secondary portion 68 fits into the main portion 66 and forms a dividing wall 70 dividing the dipper into two chambers 72 and 74. The chamber 72 has the mouth 76 which dips into the oil in the receptacle 42 at the lowermost portion of the cycle of rotation of the crank pin as shown in Figure 1. The speed of rotation will force the oil into the compartment 72, through the opening 78 formed by cutting away a portion of the wall 70, and into the compartment 74 where a quantity of the oil will be trapped. A similar quantity of oil will be trapped for each revolution of the crank pin. When the crank pin reaches the upper portion of its movement and the parts are in the position shown at the right of Figure 2, the momentum of the oil will cause it to move toward the end of the compartment 74 opposite the opening 78 and toward the opening 52 in the bearing cap, where the centrifugal force will quickly throw it into the passage 48 and reservoir 54. The reason that the oil momentum will move the oil to the end of the compartment adjacent the opening 52 is due to the fact that as the crank pin moves to the left (Figure 1) the oil trapped in the compartment will move therewith and partake of the movement of the connecting rod end and given a definite momentum. When the crank throw passes the horizontal plane passing through the axis of rotation of the shaft, the horizontal component of the movement of the connecting rod end changes in direction and is now to the right and increases in speed until the crank pin is at the uppermost position of its cycle. The trapped oil, however, having the momentum received on the first 90° of upward movement will not readily assume the momentum of the new direction of motion and will therefore crowd to the left hand end (Figure 1) of the compartment at the opening 52 in the connecting rod cap.

The bearing between the crank pin and the connecting rod will be lubricated at all times by the oil in the passage 48 while once per revolution, or when the parts reach the position shown at the right in Figure 2, the passage 52 will take up the trapped oil from the dipper 64 and pass it into the passage 48 and simultaneously there will be moved a shot of oil from the crank pin passage 48 into the connecting rod passage 50 adequately to lubricate the wrist pin 22 in bearing 56.

At the lowermost portion of the cycle of rotation of the crank pin, or when the parts are in the position of Figure 3, any oil in the passage 48 would tend to be thrown downward into the oil pan for the reason that the centrifugal force is acting opposite to the direction it was acting when the crank pin is in the position shown at the right of Figure 2. However, inasmuch as the passage 48 is inclined, the exit 80 of the passage will be blocked by the bearing cap 38 as shown in Figure 3. This exit 80 will allow sufficient oil to reach the bearing 31 to give adequate lubrication and will prevent the centrifugal force from pushing the oil in the passage 48 through the opening 52 and into the dipper 64.

A suitable system of piping 82 is connected to the oil pump, and one pipe 84 is positioned in each receptacle 42. The end of each pipe 84 is suitably shaped as shown at 86 so that the oil from the pump will be forced in a stream into the path of movement of the dipper 64. An adequate supply of lubricant to the dipper is therefore assured at all times.

We claim:

1. In a lubricating system for internal combustion engines having an oil receptacle and a connecting rod interconnecting the wrist pin of a piston with the crank pin of a crank shaft, means on the connecting rod to take up a quantity of oil from the receptacle when the crank shaft rotates, means in the connecting rod and crank shaft pin to enable the oil to pass from the said first-named means to the interior of the crank shaft pin, and an oil passage in the connecting rod to enable the oil to pass from the crank shaft pin to the wrist pin of the piston.

2. In a lubricating system for internal combustion engines having an oil receptacle and a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising means secured to the connecting rod to dip or scoop up a quantity of oil from the receptacle at the lower portion of the cycle of rotation of the crank pin, means in the connection of the connecting rod to the crank pin and in the crank pin to enable the centrifugal force to cause the oil to pass into the interior of the crank pin, a passage in the connecting rod leading from the crank pin to the wrist pin and communicating with said last named means at the upper portion of the cycle of rotation of the crank shaft to enable the centrifugal force to force a portion of the oil from the interior of the crank pin into the passage to lubricate the wrist pin.

3. In a lubricating system for internal combustion engines having a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising means secured to the connecting rod to dip or scoop up a quantity of oil at the lower portion of the cycle of rotation of the crank pin, oil passages in the connecting rod bearing and in the crank pin communicating with said means at certain portions only of the cycle of rotation of the crank shaft, said passages being out of communication with the said means at the lower portion of the cycle of rotation of the crank pin and in communication therewith at the upper portion of the cycle to enable the centrifugal force to cause the oil from said means to be moved into the crank pin passage, and a passage in the connecting rod leading to the wrist pin, said connecting rod passage being in communication with the crank pin passage when the crank pin is at the upper portion of the cycle of rotation to enable the centrifugal force to cause a portion of the oil in the crank pin passage to be forced into the passage in the connecting rod to lubricate the wrist pin.

4. In a lubricating system for internal combustion engines having a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising a dipper secured to the connecting rod to dip or scoop up and trap a quantity of oil at the lower portion of the cycle of rotation of the crank pin, means in the connection of the connecting rod with the crank pin and in the crank pin to enable the centrifugal force to cause the oil trapped in the dipper to pass into the interior of the crank pin at the upper portion of the cycle of rotation of the crank pin, a passage in the connecting rod leading to the wrist pin and communicating with said last-named means at the upper portion of the cycle of rotation of the crank pin to enable the centrifugal force to force a portion of the oil from the interior of the crank pin into the connecting rod passage to lubricate the wrist pin.

5. In a lubricating system for internal combustion engines having an oil receptacle and a connecting rod interconnecting the wrist pin of a piston with the crank pin of a crank shaft, means on the connecting rod to take up and trap a quantity of oil from the receptacle when the crank shaft rotates, an inclined passage in the crank pin and an opening in the connecting rod cap to enable the oil to pass from the said means to the interior of the crank shaft pin, said inclined passage being in communication with said opening at the upper portion only of the cycle of rotation of the crank pin, and an oil passage in the connecting rod to enable the oil to pass from the crank pin to the wrist pin at the upper portion only of the cycle of rotation of the crank pin.

6. In a lubricating system for internal combustion engines having an oil pump, an oil receptacle and a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising means secured to the connecting rod to dip or scoop up and trap a quantity of oil from the receptacle at the lower portion of the cycle of rotation of the crank pin, means connected to the pump and terminating in the receptacle to cause a stream of oil to be forced into the path of movement of said first named means, an opening in the connection of the connecting rod to the crank pin and a passage in the crank pin to enable the centrifugal force to cause the oil to pass into the interior of the crank pin, a passage in the connecting rod leading from the crank pin to the wrist pin and communicating with said crank pin passage at the upper portion of the cycle of rotation of the crank shaft to enable the centrifugal force to force a portion of the oil from the interior of the crank pin into the connecting rod passage to lubricate the wrist pin.

7. In a lubricating system for internal combustion engines having an oil receptacle and a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising means secured to the connecting rod to dip or scoop up a quantity of oil from the receptacle at the lower portion of the cycle of rotation of the crank pin, an opening in the connecting rod bearing and an inclined passage in the crank pin communicating with said means at certain portions only of the cycle of rotation of the crank shaft, said passage being out of communication with said opening at the lower portion of the cycle of rotation of the crank pin and in communication therewith at the upper portion of the cycle, and a passage in the connecting rod, an oil chamber in said pin communicating with said passage, said connecting rod passage being in communication with the crank pin passage when the crank pin is at the upper portion of the cycle of rotation to enable the centrifugal force to cause a portion of the oil in the crank pin passage and chamber to be forced into the passage in the connecting rod to lubricate the wrist pin, the oil from said means being moved into the crank pin passage by the centrifugal force when the inclined passage communicates with said opening.

8. In a lubricating system for internal combustion engines having a lubricant receptacle and a crank shaft provided with a crank pin and a connecting rod interconnecting the crank pin to a piston by a wrist pin, means for lubricating the crank pin bearing and the wrist pin bearing by means of the centrifugal force caused by the rotation of the crank shaft, comprising a dipper secured to the connecting rod to dip or scoop up and trap a quantity of oil from the receptacle at the lower portion of the cycle of rotation of the crank pin, an opening in the connection of the connecting rod with the crank pin and a passage in the crank pin to enable the centrifugal force to cause the oil trapped in the dipper to pass into the interior of the crank pin at the upper portion of the cycle of rotation of the crank pin, an oil storage chamber in the pin in communication with said passage, a passage in the connecting rod leading to the wrist pin and communicating with said crank pin passage at the upper portion only of the cycle of rotation of the crank pin to enable the centrifugal force to force a portion of the oil from the interior of the crank pin into the connecting rod passage to lubricate the wrist pin, the oil trapped in said dipper being moved into the crank pin passage by the centrifugal force at the upper portion of the cycle of rotation of the crank pin.

9. In a means for lubricating the crank pin of a crank shaft, said crank pin having a connecting rod connected thereto by a bearing, means attached to the connecting rod to take up and trap a quantity of oil as the crank shaft rotates, said bearing having an oil opening, a passage in the crank pin communicating with the opening once each revolution to take up the oil from the said means, a storage reservoir in said crank pin to store the oil taken up from the said means, said oil in the reservoir and passage lubricating the connecting rod bearing.

10. In a lubricating system for internal combustion engines having an oil pump, an oil receptacle and a crank shaft provided with a crank pin and a connecting rod interconnecting the crank pin to the wrist pin of a piston, means for lubricating the crank pin bearing and the wrist pin bearing by means of the centrifugal force caused by the rotation of the crank shaft, comprising a dipper secured to the connecting rod to dip or scoop up and trap a quantity of oil from the receptacle at the lower portion of the cycle of rotation of the crank pin, a pipe connected to the pump and terminating in the receptacle, its end pointing into the dipper to cause a stream of oil to be forced into the dipper therefrom, openings in the connecting rod bearing, crank pin and upper connecting rod proper which are in alignment at only one position of the cycle to feed oil from the dipper to both the wrist pin and connecting rod bearing.

ROBERT M. McMILLIN.
ALEX TAUB.